United States Patent
Robertson et al.

(10) Patent No.: US 8,414,695 B2
(45) Date of Patent: *Apr. 9, 2013

(54) THERMAL INK JET INK COMPOSITION

(75) Inventors: Casey Robertson, Romeoville, IL (US); Anthony Selmeczy, West Chicago, IL (US); John P. Folkers, Palatine, IL (US)

(73) Assignee: Videojet Technologies Inc.

(*) Notice: Subject to any disclaimer, the term of this patent is extended or adjusted under 35 U.S.C. 154(b) by 0 days.

This patent is subject to a terminal disclaimer.

(21) Appl. No.: 13/398,605

(22) Filed: Feb. 16, 2012

(65) Prior Publication Data

US 2012/0147087 A1 Jun. 14, 2012

Related U.S. Application Data

(63) Continuation of application No. 12/059,753, filed on Mar. 31, 2008, now Pat. No. 8,142,558.

(51) Int. Cl.
*C09D 11/02* (2006.01)

(52) U.S. Cl.
USPC ..................................... 106/31.59; 106/31.58

(58) Field of Classification Search ............... 106/31.59, 106/31.58
See application file for complete search history.

(56) References Cited

U.S. PATENT DOCUMENTS

| | | | |
|---|---|---|---|
| 4,567,213 A | 1/1986 | Bhatia | |
| 4,975,117 A * | 12/1990 | Tabayashi et al. | 106/31.58 |
| 5,006,172 A | 4/1991 | Chieng | |
| 5,076,843 A | 12/1991 | Acitelli | |
| 5,466,287 A | 11/1995 | Lyon | |
| 5,755,860 A | 5/1998 | Zhu | |
| 5,935,308 A | 8/1999 | Siddiqui et al. | |
| 6,010,564 A | 1/2000 | Zhu | |
| 6,444,019 B1 * | 9/2002 | Zou et al. | 106/31.4 |
| 7,041,163 B2 | 5/2006 | Roman | |
| 7,148,268 B2 | 12/2006 | Zhu | |
| 7,794,033 B2 | 9/2010 | Schaeffer | |
| 8,142,558 B2 * | 3/2012 | Robertson et al. | 106/31.58 |
| 8,142,559 B2 * | 3/2012 | Robertson et al. | 106/31.58 |
| 8,182,597 B2 * | 5/2012 | Robertson et al. | 106/31.58 |
| 2008/0000385 A1 * | 1/2008 | Moss et al. | 106/31.27 |
| 2008/0000387 A1 * | 1/2008 | Renner et al. | 106/31.59 |
| 2008/0119593 A1 | 5/2008 | Stramel | |
| 2012/0013677 A1 * | 1/2012 | Robertson et al. | 347/20 |
| 2012/0026257 A1 * | 2/2012 | Robertson et al. | 347/86 |

FOREIGN PATENT DOCUMENTS

EP 1174475 1/2002

* cited by examiner

*Primary Examiner* — Kaj K Olsen
*Assistant Examiner* — Veronica F Faison
(74) *Attorney, Agent, or Firm* — Joseph A. Yosick

(57) ABSTRACT

A thermal ink jet ink composition includes one or more volatile organic solvents, one or more humectants, one or more binder resins, one or more dyes, and one or both of a surfactant and a plasticizer. The one or more volatile organic solvents are selected from $C_1$-$C_4$ alcohols, $C_3$-$C_6$ ketones, $C_4$-$C_8$ ethers, $C_3$-$C_6$ esters, and mixtures thereof. The one or more humectants are present in an amount not more than 30% by weight of the ink jet ink composition. The ink jet ink composition optionally includes water up to 10% by weight of the ink jet ink composition.

20 Claims, No Drawings

THERMAL INK JET INK COMPOSITION

CROSS REFERENCE TO RELATED APPLICATIONS

This application is a Continuation of U.S. application Ser. No. 12/059,753 filed Mar. 31, 2008 now U.S. Pat. No. 8,142,558, the contents of which are incorporated herein by reference in its entirety.

BACKGROUND OF THE INVENTION

Thermal ink jet (TIJ) print heads produce ink droplets from thermal vaporization of the ink solvent. In the jetting process, a resistor is heated rapidly to produce a vapor bubble which subsequently ejects a droplet from the orifice. This process is extremely efficient and reproducible. Modern TIJ print heads for industrial graphics applications are capable of generating uniform drops of 4 pL or smaller in volume at frequencies of 36 kHz or greater. Typical commercial TIJ devices are specifically designed to vaporize water or solvents that have physical properties close to those of water (e.g. high boiling point, large heat capacity, low molecular weight).

Although TIJ printing systems have been available for over 30 years, nearly all of the commercial inks available for thermal ink jet systems have been water-based, i.e. they contain more than 50% water. Such aqueous inks have one or more drawbacks such as long ink dry times or poor adhesion to semi-porous or non-porous substrates.

There is a desire for inks with attractive performance characteristics such as short dry times, long decap times and good adhesion when using a TIJ system to print onto semi-porous and non-porous substrates.

BRIEF SUMMARY OF THE INVENTION

The invention provides a thermal ink jet ink composition including one or more volatile organic solvents, one or more humectants, one or more binder resins, and one or more dyes. In an embodiment, the humectants are present in an amount not more than 30% by weight of the ink jet ink composition.

In another embodiment, the thermal ink jet ink composition includes one or more volatile organic solvents, one or more humectants, one or more binder resins, one or more dyes, and one or both of a surfactant and a plasticizer. The one or more volatile organic solvents are selected from $C_1$-$C_4$ alcohols, $C_3$-$C_6$ ketones, $C_4$-$C_8$ ethers, $C_3$-$C_6$ esters, and mixtures thereof. The one or more humectants are present in an amount not more than 30% by weight of the ink jet ink composition. The ink jet ink composition optionally includes water up to 10% by weight of the ink jet ink composition.

The disclosure also provides a method for printing images on a substrate in a thermal ink jet printer including directing droplets of the thermal ink jet ink composition of the invention to a substrate and allowing the ink droplets to dry, thereby printing images on a substrate.

The thermal ink jet ink composition of the invention has one or more of the following features: short dry times, long decap times, good adhesion to substrates, safety, and material compatibility. Decap time is defined as the amount of time a nozzle can remain dormant and then be fired again without detrimental effect on the droplet velocity, weight or direction. Fluids with good material compatibility are defined as those which do not degrade the ability of the TIJ cartridge to fire for some reasonable length of time. The thermal ink jet ink composition does not require heat assist (e.g., thermal driers) when printed on semi-porous and non-porous substrates.

DETAILED DESCRIPTION OF THE INVENTION

The invention provides a thermal ink jet ink composition comprising one or more volatile organic solvents, one or more humectants, one or more binder resins, and one or more colorants.

In an embodiment, the invention provides a thermal ink jet ink composition comprising one or more volatile organic solvents, one or more humectants, one or more binder resins, and one or more dyes, wherein the humectants are present in an amount not more than 30% by weight of the ink jet ink composition, wherein the one or more volatile organic solvents are selected from the group consisting of $C_1$-$C_4$ alcohols, $C_4$-$C_8$ ethers, $C_3$-$C_6$ ketones, $C_3$-$C_6$ esters, and mixtures thereof.

In another embodiment, the invention provides a thermal ink jet ink composition comprising one or more $C_1$-$C_4$ alcohols, one or more humectants, one or more binder resins, one or more colorants, and one or more plasticizers, wherein the plasticizers are present in an amount not more than 5% by weight of the ink jet ink composition and are selected from the group consisting of butyl benzyl phthalate, n-ethyl o,p-toluene sulfonamide, and mixtures thereof.

In yet another embodiment, the invention provides a thermal ink jet ink composition comprising one or more volatile organic solvents, one or more humectants, one or more binder resins, one or more pigments, wherein the humectants are present in an amount not more than 30% by weight of the ink jet ink composition and the ink jet ink composition is free or substantially free of a polymeric surfactant, wherein the one or more volatile organic solvents are selected from the group consisting of $C_1$-$C_4$ alcohols, $C_4$-$C_8$ ethers, $C_3$-$C_6$ ketones, $C_3$-$C_6$ esters, and mixtures thereof.

In accordance with an embodiment, the volatile organic solvents are selected from the group consisting of $C_1$-$C_4$ alcohols, $C_4$-$C_8$ ethers, $C_3$-$C_6$ ketones, $C_3$-$C_6$ esters, and mixtures thereof. Examples of $C_1$-$C_4$ alcohols include methanol, ethanol, 1-propanol, and 2-propanol. Examples of $C_4$-$C_8$ ethers include diethyl ether, dipropyl ether, dibutyl ether and tetrahydrofuran. Examples of $C_3$-$C_6$ ketones include acetone, methyl ethyl ketone and cyclohexanone. Examples of $C_3$-$C_6$ esters include methyl acetate, ethyl acetate and n-butyl acetate. The organic solvents, particularly alcohols, ketones, and esters, have an attractive feature that they penetrate semi- and non-porous substrate surfaces more readily than water based inks, thus reducing dry time and improving adhesion.

The one or more volatile organic solvents can be present in any suitable amount, for example, in an amount 50% or more, about 60% or more, about 70% or more, about 80% or more, or about 90% or more by weight of the ink jet ink composition. In an embodiment, the one or more volatile organic solvents can be present in an amount from 50 to about 99%, preferably from about 60 to about 97%, and more preferably from about 80 to about 95% of the ink jet ink composition. The thermal ink jet ink composition of the invention can optionally include water in a suitable amount, e.g., up to 49% by weight, up to about 25% by weight, or up to about 10% by weight, up to about 5% by weight, or up to about 2% by weight of the ink jet ink composition.

The thermal ink jet ink composition of the invention can include any suitable colorant or colorants, which may be dye or pigment. In an embodiment of the invention, one or more dyes are employed as the colorant, wherein the one or more dyes are selected from the group consisting of acid dyes, basic dyes, solvent dyes, disperse dyes, mordant dyes and any combination thereof. Examples of solvent dyes include naphthol dyes, azo dyes, metal complex dyes, anthraquinone dyes, quinoimine dyes, indigoid dyes, benzoquinone dyes, carbonium dyes, naphthoquinone dyes, naphthalimide dyes, phthalocyanine dyes, and perylene dyes.

For example, the thermal ink jet ink composition can include one or more dyes are selected from the group consisting of C.I. Solvent Yellow 19, C.I. Solvent Yellow 21, C.I. Solvent Yellow 61, C.I. Solvent Yellow 80, C.I. Solvent Orange 1, C.I. Orange 37, C.I. Orange 40, C.I. Solvent Orange 54, C.I. Solvent Orange 63, C.I. Solvent Red 8, Solvent Red 49, C.I. Solvent Red 81, C.I. Solvent Red 82, C.I. Solvent Red 84, C.I. Solvent Red 100, C.I. Acid Red 92, C.I. Reactive red 31, Orient Pink 312, C.I. Basic Violet 3, C.I. Basic Violet 4, C.I. Solvent Violet 8, C.I. Solvent Violet 21, C.I. Solvent Blue 2, C.I. Solvent Blue 5, C.I. Solvent Blue 11, C.I. Solvent Blue 25, C.I. Solvent Blue 36, C.I. Solvent Blue 38, C.I. Solvent Blue 55; C.I. Solvent Blue 70, C.I. Solvent Green 3, C.I. Solvent Black 3, C.I. Solvent Black 5, C.I. Solvent Black 7, C.I. Solvent Black 22, Solvent Black 26, C.I. Solvent Black 27 (MORFAST BLACK 101), C.I. Solvent Black 29 (VALIFAST BLACK 3808), C.I. Acid Black 123, C.I. Solvent Black 48, C.I. Oil Blue 613, and any combination thereof, and preferably one or more dyes selected from the group consisting of C.I. Solvent Black 29 (ORASOL BLACK RLI™), C.I. Solvent Black 26, C.I. Solvent Black 48, C.I. Solvent Black 3 (Oil Black 860), C.I. Basic Violet 3, C.I. Solvent Blue 38, C.I. Solvent Blue 70, C.I. Oil Blue 613, C.I. Solvent Red 49 (ORIENT PINK™ 312), C.I. Solvent Orange 54 (VALIFAST ORANGE™ 3210), and any combination thereof.

Any suitable pigment can be used, for example, one or more pigments selected from the group consisting of phthalocyanine blue, carbon black, mars black, quinacridone magenta, ivory black, prussian blue, cobalt blue, ultramarine blue, manganese blue, cerulean blue, indathrone blue, chromium oxide, viridian, cobalt green, terre verte, nickel azo yellow, light green oxide, phthalocyanine green-chlorinated copper phthalocyanine, burnt sienna, perinone orange, irgazin orange, quinacridone magenta, cobalt violet, ultramarine violet, manganese violet, dioxazine violet, zinc white, titanium white, flake white, aluminum hydrate, blanc fixe, china clay, lithophone, arylide yellow G, arylide yellow 10G, barium chromate, chrome yellow, chrome lemon, zinc yellow, cadmium yellow, aureolin, naples yellow, nickel titanate, arylide yellow GX, isoindolinone yellow, flavanthrone yellow, yellow ochre, chromophthal yellow 8GN, toluidine red, quinacridone red, permanent crimson, rose madder, alizarin crimson, vermilion, cadmium red, permanent red FRG, brominated anthranthrone, naphthol carbamide, perylene red, quinacridone red, chromophthal red BRN, chromophthal scarlet R, aluminum oxide, barium oxide, bismuth oxide, boric oxide, cadmium oxide, calcium oxide, cerium oxide, chromium oxide, cobalt oxide, copper oxide, iridium oxide, lead oxide, magnesium oxide, manganese oxide, nickel oxide, phosphorus oxide, potassium oxide, rutile, silicon oxide, silver oxide, sodium oxide, strontium oxide, tin oxide, titanium oxide, vanadium oxide, zinc oxide, zirconium oxide, and any combination thereof.

In embodiments, the pigments are selected from the group consisting of azo pigments, phthalocyanine pigments, quinacridone pigments, dioxazine pigments, isoindolinone pigments, metal oxide pigments, carbon black, and any combination thereof.

The pigments can have any suitable particle size, for example, from about 0.005 micron to about 15 microns, preferably from about 0.005 to about 1 micron, and more preferably from about 0.01 to about 0.3 micron.

In any of the embodiments above, the colorant, dye or pigment, can be present in an amount from about 0.01% to about 10%, preferably from about 0.5% to about 7%, and more preferably from about 1% to about 5% by weight of the ink jet ink composition.

In any of the embodiments above, any suitable humectant can be used. Preferably, humectants have a boiling point greater than 150° C., greater than 200° C., or greater than 250° C., and/or a relative evaporation rate less than 1.0, less than 0.9, less than 0.7, less than 0.4, less than 0.1, or less than 0.01. The humectants typically are solvents having one or more polar functional groups such as hydroxyl, ether, amide, ester, ketone, and carbonate, for example, two functional groups, which may be the same or different, such as two hydroxyl groups or one hydroxyl group and one ether group. In an embodiment, the one or more humectants are selected from the group consisting of polyol, glycol ether, diacetone alcohol, 2-pyrrolidinone, N-methylpyrrolidinone, ethyl lactate, propylene carbonate, 1,3-dimethyl-2-imidazolidindione, and alkyl esters, and any combination thereof.

For example, the polyol is selected from the group consisting of polyethylene glycol, polypropylene glycol, poly(ethylene-co-propylene glycol), polyvinyl alcohol, trimethylol propane, ethylene glycol, glycerin, diethylene glycol, triethylene glycol, tripropylene glycol, tetraethylene glycol, pentaethylene glycol, 1,2-propylene glycol, 1,3-propanediol, butylene glycol, triethylene glycol, 1,2,6-hexanetriol, thiodiglycol, hexylene glycol, bis-2-hydroxyethyl ether, 1,4-butanediol, 1,2-butenediol, 1,4-butenediol, 1,3-butenediol, 1,5-pentanediol, 2,4-pentanediol, 2,4-heptanediol, 1,8-octanediol, 1,10-decanediol, 1,12-dodecanediol, 1,4-cyclohexanediol, 1,4-cyclohexanedimethanol, 1,2-bis(hydroxymethyl)cyclohexane, 1,2-bis(hydroxyethyl)-cyclohexane, 3-methyl-1,5-pentanediol, 2,2,4-trimethyl-1,3-pentanediol, neopentyl glycol, pentaerythritol, sorbitol, mannitol, and any combination thereof, and preferably the polyol is selected from the group consisting of polyethylene glycol, trimethylol propane, ethylene glycol, glycerin, diethylene glycol, tripropylene glycol, and any combination thereof, A preferred humectant is glycol ether, for example, a glycol ether selected from the group consisting of ethylene glycol monomethyl ether, ethylene glycol monoethyl ether, propylene glycol monomethyl ether, tripropylene glycol monomethyl ether, ethylene glycol monobutyl ether, diethylene glycol monomethyl ether, diethylene glycol monoethyl ether, propylene glycol n-propyl ether, propylene glycol t-butyl ether, propylene glycol n-butyl ether, dipropylene glycol methyl ether, dipropylene glycol n-propyl ether, dipropylene glycol t-butyl ether, dipropylene glycol n-butyl ether, tripropylene glycol n-propyl ether, tripropylene glycol t-butyl ether, tripropylene glycol n-butyl ether, ethyl cellosolve, methyl cellosolve, polyethylene glycol monomethyl ether, polypropylene glycol monomethyl ether, methoxytriglycol, ethoxytriglycol, butoxytriglycol, 1-butoxyethoxy-2-propanol, and any combination thereof, and preferably, the glycol ether is selected from the group consisting of ethylene glycol monomethyl ether, ethylene glycol monoethyl ether, propylene glycol monomethyl ether, tripropylene glycol monomethyl ether, ethylene glycol monobutyl ether, diethylene glycol monomethyl ether, diethylene glycol monoethyl ether, and any combination thereof. In embodiments of the invention, propylene glycol monomethyl ether is a preferred humectant.

Humectants contribute, at least in part, to a feature of the thermal ink jet ink composition. Thus, humectants can lengthen decap times; however, excessive amounts of humectants could increase the dry time of the ink jet ink composition. In any of the embodiments, the one or more humectants can be present in any suitable amount, for example, in an amount about 50% by weight or less, about 40% by weight or less, preferably about 30% by weight or less, about 25% by weight or less, about 20% by weight or less, about 15% by weight or less, or about 10% by weight or less. In an embodiment, the one or more humectants can be present in an amount from about 1% to about 30%, preferably from about 2% to about 15%, and more preferably from about 3% to about 10% of the ink jet ink composition.

As discussed, the thermal ink jet ink composition of the invention includes one or more binder resins. Any suitable binder resin, soluble or dispersible, can be employed, preferably a solvent soluble binder resin. In an embodiment, the thermal ink jet ink composition of the invention includes one or more binder resins selected from the group consisting of polyamide resins, polyurethane resins, rosin ester resins, acrylic resins, polyvinyl butyral resins, polyesters, polyurethanes, phenolic resins, polyimides, vinyl resins, ethylene vinyl acetate resins, polystyrene/acrylates, cellulose ethers, cellulose nitrate resins, polymaleic anhydrides, acetal polymers, polystyrene/butadienes, polystyrene/methacrylates, sulfonated polyesters, aldehyde resins, and polyketone resins, and any combination thereof, and preferably one or more binder resins selected from the group consisting of polyamide resins, rosin ester resins, acrylic resins, polyketone resins, and any combination thereof. An example of a suitable polyamide resin is ARIZONA 201-150™ available from Arizona Chemical Company, Jacksonville, Fla., or COGNIS VERSAMID 756™, available from Cognis GmbH, Monheim am Rhein, Germany, both of which are alcohol-soluble polyamide resins. Examples of wood rosin ester resins include UNIREZ™ 8115, available as a 40% solution in ethanol from Penn Color, Doylestown, Pa., which is a hydrogenated wood rosin ester, and STAYBELITE™ ESTER 10, available from Chem Central Corporation. Examples of cellulose nitrate resins are NOBEL™ DLX 3-5 or NOBEL™ DHX 5-8, available from Nobel Enterprises. Examples of polyvinyl butyral resins are PIOLOFORM™ BN18, available from Wacker Chemie AG, and MOWITAL™ B20H available from Kuraray America, Inc.

The binder resin can be present in any suitable amount, for example, in an amount from about 0.1 to about 30%, preferably from about 0.2 to about 15%, and more preferably from about 0.3 to about 8% of the ink jet ink composition.

In a particular embodiment of the thermal ink jet ink composition of the invention, the volatile organic solvent or solvents can be present in an amount from about 50% to about 95% by weight, the colorant(s) (dyes, pigments, or a combination thereof), can be present in amount from about 1% to about 8% by weight, the glycol ether can be present in an amount from about 3% to 30% by weight, and the binder resin can be present in an amount from about 1% to about 15% by weight of the ink jet ink composition.

The thermal ink jet ink composition of the invention can further include one or more additives such as surfactants, plasticizers, or conductive salts. Preferably, a polymeric surfactant is employed. Examples of surfactants include siloxanes, silicones, silanols, polyoxyalkyleneamines, propoxylated (poly(oxypropylene)) diamines, alkyl ether amines, nonyl phenol ethoxylates, ethoxylated fatty amines, quaternized copolymers of vinylpyrrolidone and dimethyl aminoethyl methacrylate, fluorinated organic acid diethanolamine salts, alkoxylated ethylenediamines, polyethylene oxides, polyoxyalkylene polyalkylene polyamines amines, polyoxyalkylene polyalkylene polyimines, alkyl phosphate ethoxylate mixtures, polyoxyalkylene derivatives of propylene glycol, and polyoxyethylated fatty alcohols. A specific example of a suitable polymeric surfactant, e.g., Silicone Fluid SF-69, available from Dow Corning Co, Midland, Mich., which is a blend of silanols and cyclic silicones. Additional examples of polymeric surfactants include DISPERSYBYK™ (BYK-Chemie, USA), SOLSPERSE SOLSPERSE™ 13940 which is a polymer/fatty acid condensation polymer) and EFKA™ (EFKA Chemicals) polymeric dispersants.

In any of the embodiments of the invention, the surfactant can be present in an amount from about 0.01 to about 1.0%, preferably from about 0.01 to about 0.5%, and more preferably from about 0.01 to about 0.1% of the ink jet ink composition.

Examples of suitable plasticizers include phthalate plasticizers, e.g., alkyl benzyl phthalates, butyl benzyl phthalate, dioctyl phthalate, diisobutyl phthalate, dicyclohexyl phthalate, diethyl phthalate, dimethyl isophthalate, dibutyl phthalate, and dimethyl phthalate, esters such as di-(2-ethylhexy)-adipate, diisobutyl adipate, glycerol tribenzoate, sucrose benzoate, polypropylene glycol dibenzoate, neopentyl glycol dibenzoate, dibutyl sebacate, and tri-n-hexyltrimellitate, and sulfonamide plasticizers such as Plasticizer 8, available from Monsanto Co., St. Louis, Mo., which is n-ethyl o,p-toluene sulfonamide.

In embodiments of the invention, the plasticizer can be present in an amount from about 0.1 to about 5.0%, preferably from about 0.3 to about 3.0%, and more preferably from about 0.5 to about 2.0% of the ink jet ink composition.

The thermal ink jet ink composition of the invention may include additional ingredients such as surfactants, bactericides, fungicides, algicides, sequestering agents, buffering agents, corrosion inhibitors, antioxidants, light stabilizers, anti-curl agents, thickeners, and other agents known in the relevant art. In an embodiment, the ink composition of the invention is free or substantially free of antioxidants.

The thermal ink jet ink composition of the invention has one or more attractive features such as short unassisted dry times of printed alphanumeric or graphic images, long decap times, good adhesion to semi-porous and non-porous substrates, and safety or material compatibility with one or more components of a thermal ink jet printer. For example, embodiments of the thermal ink jet ink composition of the invention have a dry time of about 10 seconds or less, such as 7 seconds or less, 4 seconds or less, or 2 seconds or less, under ambient conditions. On porous substrates, the dry times are shorter than in semi- or non-porous substrates. For example, embodiments of the thermal ink jet ink composition of the invention have a dry time of about 1 second on porous substrates and less than about 5 seconds, preferably less than about 2 seconds, and more preferably less than about 1 second on semi-porous substrates.

The thermal ink jet ink composition of the invention can have any suitable viscosity or surface tension. In embodiments of the invention, the thermal ink jet ink composition has a viscosity of less than about 10 cPs, preferably less than about 5 cPs, and more preferably less than about 3 cPs, for example, a viscosity from about 1 to 4 or from about 1 to about 3 cPs at 25° C.

In embodiments of the invention, the thermal ink jet ink composition has a surface tension from about 20 to about 50 mN/m, from about 21 to about 40 mN/m, or from about 22 to about 30 mN/m at 25° C.

The thermal ink jet ink composition of the invention can be prepared by any suitable method. For example, the chosen ingredients can be combined and mixed with adequate stirring and the resulting fluid filtered to remove any undissolved impurities.

The present invention further provides a method for printing images on a substrate in a thermal ink jet printer comprising directing a stream of droplets of any of the embodiments of the thermal ink jet ink composition of the invention to a substrate and allowing the ink droplets to dry, thereby printing images on a substrate. Any suitable substrate can be printed in accordance with the invention. Examples of suitable substrates include porous substrates such as uncoated paper, semi-porous substrates such as aqueous coated paper, clay coated paper, silica coated paper, UV overcoated paper, polymer overcoated paper, and varnish overcoated paper, and non-porous substrates such as hard plastics, polymer films, metals, glass, and ceramics. The paper substrates can be thin sheets of paper, rolls of paper, or cardboard. Plastics, metals, glass, and ceramic substrates can be in any suitable form such as in the form of bottles or containers, plates, rods, cylinders, etc.

Examples of polymer coating include a coating of polystyrene, polyvinyl alcohol, polyacryate, polymethacrylate, polystryrene or polyvinyl chloride. Examples of polymer film substrates include polyvinyl butyrals, polyolefins, polyvinyl chloride, polyethylene terephthalate, PETG, polybutylene terephthalate (PBT), polyester, polycarbonate, acrylonitrile-butadiene-styrene (ABS) copolymer, polyvinyl fluoride polymer, polyamides, polyimides, and cellulose. Plastics can be treated plastics (e.g. chemical etch, corona discharge, flame plasma, etc.) or untreated plastics. Examples of metals include aluminum, copper, stainless steel, and metal alloys. Examples of ceramics include oxides, nitrides, and carbides of metals.

The following examples further illustrate the invention but, of course, should not be construed as in any way limiting its scope.

EXAMPLE 1

This example illustrates embodiments of the thermal ink jet ink composition of the invention. The materials employed in preparing the ink jet ink composition, their amounts, and the formulation numbers are set forth in Table 1 below.

TABLE 1

Ink formulations in accordance with embodiments of the invention

| Material | 2520 | 2538 | 5521 | 5678 | 5745 | 5750 | 5762 | 5798 | 5815 | 5817 | 5818 |
|---|---|---|---|---|---|---|---|---|---|---|---|
| ethanol |  |  |  | 86.55 | 45.35 | 45.49 | 25.00 | 85.49 | 41.50 | 86.00 | 86.00 |
| isopropanol | 73.45 |  |  |  |  |  |  |  |  |  |  |
| 1-propanol |  | 79.00 |  |  |  |  |  |  |  |  |  |
| 1-butanol |  |  | 82.28 |  |  |  |  |  |  |  |  |
| methanol |  |  |  |  |  |  |  |  | 41.00 |  |  |
| glycol ether PM | 10.50 | 5.00 | 3.15 | 3.50 | 45.10 | 40.00 | 50.00 | 10.00 | 10.00 | 10.00 | 10.00 |
| Valifast Black 3808 | 4.00 | 4.00 |  |  |  | 4.00 | 4.00 | 4.00 | 4.00 | 4.00 |  |
| Orasol Black RLI |  |  |  |  | 5.00 |  |  |  |  |  |  |
| Valifast Orange 3210 |  |  | 1.06 | 1.00 | 1.00 | 1.00 |  |  |  |  |  |
| Orient Oil Pink 312 |  |  | 1.38 | 1.40 |  |  |  |  |  |  |  |
| 40% Unirez 8115 in EtOH | 12.00 | 12.00 | 12.08 |  |  |  |  |  |  |  |  |
| 20% Arizona 201-150 in EtOH |  |  |  |  |  |  | 20.00 |  |  |  |  |
| 40% Cognis Versamid 756 in EtOH |  |  |  | 7.50 |  |  |  |  |  |  |  |
| Nobel DLX 3-5 |  |  |  |  |  |  |  |  | 3.00 |  |  |
| Piloform LL 4140 |  |  |  |  | 3.00 |  |  |  |  |  |  |
| Joncryl 682 |  |  |  |  |  |  | 6.00 |  |  |  |  |
| K-Plast 1022 |  |  |  |  |  |  | 3.00 |  |  |  |  |
| Silicone fluid SF69 | 0.05 |  | 0.05 | 0.05 | 0.05 | 0.01 |  | 0.01 | 0.01 | 0.01 | 0.01 |
| Plasticizer 8 |  |  |  |  | 0.50 | 0.50 | 1.00 |  | 0.50 | 0.50 |  |

EXAMPLE 2

This Example illustrates the ink dry times of embodiments of the thermal ink jet ink composition of the invention.

TABLE 2

Ink dry times of embodiments of the ink composition on various substrates

| Formulation Number | Substrate | Type | Unassisted Dry Time, sec |
|---|---|---|---|
| 5678 | Clay Coat | semi-porous | 1 |
|  | Aqueous Coat | semi-porous | 2 |
|  | Varnish Coat | semi-porous | 2 |
|  | UV Coat | semi-porous | 3 |
|  | HDPE | non-porous | 1 |
|  | Polypropylene | non-porous | 2 |
|  | PET | non-porous | 1 |
|  | PVC | non-porous | 2 |
|  | Glass | non-porous | 2 |
|  | Aluminum | non-porous | 1 |
| 5750 | Clay Coat | semi-porous | 1 |
|  | Aqueous Coat | semi-porous | 1 |
|  | Varnish Coat | semi-porous | 1 |
|  | UV Coat | semi-porous | 2 |
|  | HDPE | non-porous | 2 |
|  | Polypropylene | non-porous | 3 |
|  | PET | non-porous | 2 |
|  | PVC | non-porous | 2 |

TABLE 2-continued

Ink dry times of embodiments of the ink composition on various substrates

| Formulation Number | Substrate | Type | Unassisted Dry Time, sec |
|---|---|---|---|
| 5798 | Glass | non-porous | 2 |
| | Aluminum | non-porous | 2 |
| | Clay Coat | semi-porous | 1 |
| | Aqueous Coat | semi-porous | 1 |
| | Varnish Coat | semi-porous | 1 |
| | UV Coat | semi-porous | 2 |
| | HDPE | non-porous | 2 |
| | Polypropylene | non-porous | 3 |
| | PET | non-porous | 2 |
| | PVC | non-porous | 2 |
| | Glass | non-porous | 1 |
| | Aluminum | non-porous | 1 |

EXAMPLE 3

This Example illustrates some of the properties of embodiments of the ink jet ink composition of the invention.

TABLE 3

Properties of embodiments of the thermal ink jet ink composition of the invention

| Formulation No. | Viscosity (cPs) | Surface Tension (mN/m) |
|---|---|---|
| 5521 | 3.42 | 24.1 |
| 5678 | 1.71 | 22.6 |
| 5745 | 3.10 | 24.4 |
| 5750 | 3.28 | 25.0 |
| 2520 | 3.03 | 22.0 |
| 5798 | 1.50 | 22.6 |
| 5815 | 2.31 | 20.2 |

EXAMPLE 4

This Example illustrates the adhesion of the printed images obtained from embodiments of the ink jet ink composition of the invention. The ink jet ink composition Nos. 2520, 5745, 5750 and 5815 produce images on clay coat substrates having aqueous overcoat, UV overcoat, or varnish overcoat, as well as on polyethylene, polypropylene, polystyrene, polyvinyl chloride, polyethylene terephthalate, glass and aluminum substrates, that pass a 1 minute rub resistance test as well as a 24 hour scratch adhesion test All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A thermal ink jet ink composition comprising:
one or more volatile organic solvents, wherein the one or more volatile organic solvents are selected from $C_1$-$C_4$ alcohols, $C_3$-$C_6$ ketones, $C_4$-$C_8$ ethers, $C_3$-$C_6$ esters, and mixtures thereof;
one or more humectants, wherein the humectants are present in an amount not more than 30% by weight of the ink jet ink composition;
one or more binder resins;
one or more dyes,
a surfactant selected from siloxanes, silicones, silanols, polyoxyalkyleneamines, propoxylated (poly(oxypropylene)) diamines, alkyl ether amines, nonyl phenol ethoxylates, ethoxylated fatty amines, quaternized copolymers of vinylpyrrolidone and dimethyl aminoethyl methacrylate, fluorinated organic acid diethanolamine salts, alkoxylated ethylenediamines, polyethylene oxides, polyoxyalkylene polyalkylene polyamines, polyoxyalkylene polyalkylene polyimines, alkyl phosphate ethoxylate mixtures, polyoxyalkylene derivatives of propylene glycol, polyoxyethylated fatty alcohols, and mixtures thereof;
a plasticizer selected from ester plasticizers, sulfonamide plasticizers, and mixtures thereof; and
optionally water up to 10% by weight of the ink jet ink composition, wherein the thermal ink composition is suitable for use in thermal ink jet printers.

2. The thermal ink jet ink composition of claim 1, wherein the ink jet ink composition comprises a plasticizer selected from diisobutyl adipate, glycerol tribenzoate, sucrose benzoate, polypropylene glycol dibenzoate, neopentyl glycol dibenzoate, dibutyl sebacate, tri-n-hexyltrimellitate, n-ethyl o,p-toluene sulfonamide, and mixtures thereof.

3. The thermal ink jet ink composition of claim 2, wherein the ink jet ink composition comprises n-ethyl o,p-toluene sulfonamide.

4. The thermal ink jet ink composition of claim 1, wherein the ink jet ink composition comprises a polymeric surfactant.

5. The thermal ink jet ink composition of claim 1, wherein the ink jet ink composition comprises a surfactant selected from siloxanes, silicones, silanols, and mixtures thereof.

6. The thermal ink jet ink composition of claim 1, wherein the thermal ink jet ink composition has a dry time of 4 seconds or less when used in a thermal ink jet print head.

7. The thermal ink jet ink composition of claim 1, wherein the one or more volatile organic solvents are selected from methanol, ethanol, 1-propanol, acetone, methyl ethyl ketone, methyl acetate, ethyl acetate, n-butyl acetate, and mixtures thereof.

8. The thermal ink jet ink composition of claim 7, wherein the one or more volatile organic solvents are selected from methanol, ethanol, methyl ethyl ketone, and mixtures thereof.

9. The thermal ink jet ink composition of claim 8, wherein the one or more volatile organic solvents comprises methyl ethyl ketone.

10. The thermal ink jet ink composition of claim 8, wherein the one or more volatile organic solvents comprises ethanol.

11. The thermal ink jet ink composition of claim 1 wherein the one or more volatile organic solvents are present in an amount from 50% to 95% by weight of the ink jet ink composition.

12. The thermal ink jet ink composition of claim 1, wherein the one or more humectants are selected from glycol ether, diacetone alcohol, and mixtures thereof.

13. The thermal ink jet ink composition of claim 1, wherein the one or more binder resins are selected from polyamide resins, polyurethane resins, rosin ester resins, acrylic resins, polyvinyl butyral resins, polyester resins, polyurethane resins, phenolic resins, polyimide resins, vinyl resins, ethylene vinyl acetate resins, polystyrene/acrylate resins, cellulose ethers, cellulose nitrate resins, polymaleic anhydride resins, acetal polymers, polystyrene/butadiene resins, polystyrene/methacrylate resins, sulfonated polyester resins, aldehyde resins, polyketone resins, and mixtures thereof.

14. The thermal ink jet ink composition of claim 13, wherein the one or more binder resins are selected from rosin ester resins, acrylic resins, polyvinyl butyral resins, vinyl resins, polystyrene/acrylate resins, cellulose nitrate resins, polystyrene/methacrylate resins, sulfonated polyester resins, and mixtures thereof.

15. The thermal ink jet ink composition of claim 1, wherein the one or more dyes are selected from C.I. Solvent Orange 54, C.I. Basic Violet 3, C.I. Basic Violet 4, C.I. Solvent Black 3, C.I. Solvent Black 26, C.I. Solvent Black 27, C.I. Solvent Black 29, and mixtures thereof.

16. The thermal ink jet ink composition of claim 1, wherein the thermal ink jet ink composition has a viscosity of less than 3 cPs at 25° C.

17. The thermal ink jet ink composition of claim 1, optionally including water up to 5% by weight of the ink jet ink composition.

18. A method for printing images on a substrate with a thermal ink jet printer, comprising:
providing a thermal ink jet ink composition comprising the ink jet ink composition of claim 1;
using a thermal ink jet print head to direct droplets of the thermal ink jet ink composition to a substrate; and
allowing the ink droplets to dry, thereby printing images on a substrate.

19. The method of claim 18, wherein the thermal ink jet ink composition has a dry time of 2 seconds or less.

20. A thermal ink jet ink composition comprising:
one or more volatile organic solvents, wherein the one or more volatile organic solvents are selected from $C_1$-$C_4$ alcohols, $C_3$-$C_6$ ketones, and mixtures thereof;
one or more humectants, wherein the humectants are selected from glycol ethers, diacetone alcohol, and mixtures thereof and are present in an amount from 2% to 5% by weight of the ink jet ink composition;
one or more binder resins selected from rosin ester resins, acrylic resins, polyvinyl butyral resins, vinyl resins, polystyrene/acrylate resins, cellulose nitrate resins, polystyrene/methacrylate resins, sulfonated polyester resins, and mixtures thereof, wherein the one or more binder resins are present in an amount from about 0.3% to about 8% by weight of the ink composition;
one or more dyes,
a surfactant selected from siloxanes, silicones, silanols, polyoxyalkyleneamines, propoxylated (poly(oxypropylene)) diamines, alkyl ether amines, nonyl phenol ethoxylates, ethoxylated fatty amines, quaternized copolymers of vinylpyrrolidone and dimethyl aminoethyl methacrylate, fluorinated organic acid diethanolamine salts, alkoxylated ethylenediamines, polyethylene oxides, polyoxyalkylene polyalkylene polyamines, polyoxyalkylene polyalkylene polyimines, alkyl phosphate ethoxylate mixtures, polyoxyalkylene derivatives of propylene glycol, polyoxyethylated fatty alcohols, and mixtures thereof;
a plasticizer selected from ester plasticizers, sulfonamide plasticizers, and mixtures thereof; and
optionally water up to 5% by weight of the ink jet ink composition.

* * * * *